April 15, 1952        A. C. DAVIS        2,593,119

DEFECTIVE CRATE DETECTOR AND EJECTOR

Original Filed Dec. 30, 1942        8 Sheets-Sheet 1

Inventor

ALLAN C. DAVIS

April 15, 1952 — A. C. DAVIS — 2,593,119
DEFECTIVE CRATE DETECTOR AND EJECTOR
Original Filed Dec. 30, 1942 — 8 Sheets-Sheet 4

Inventor
ALLAN C. DAVIS.

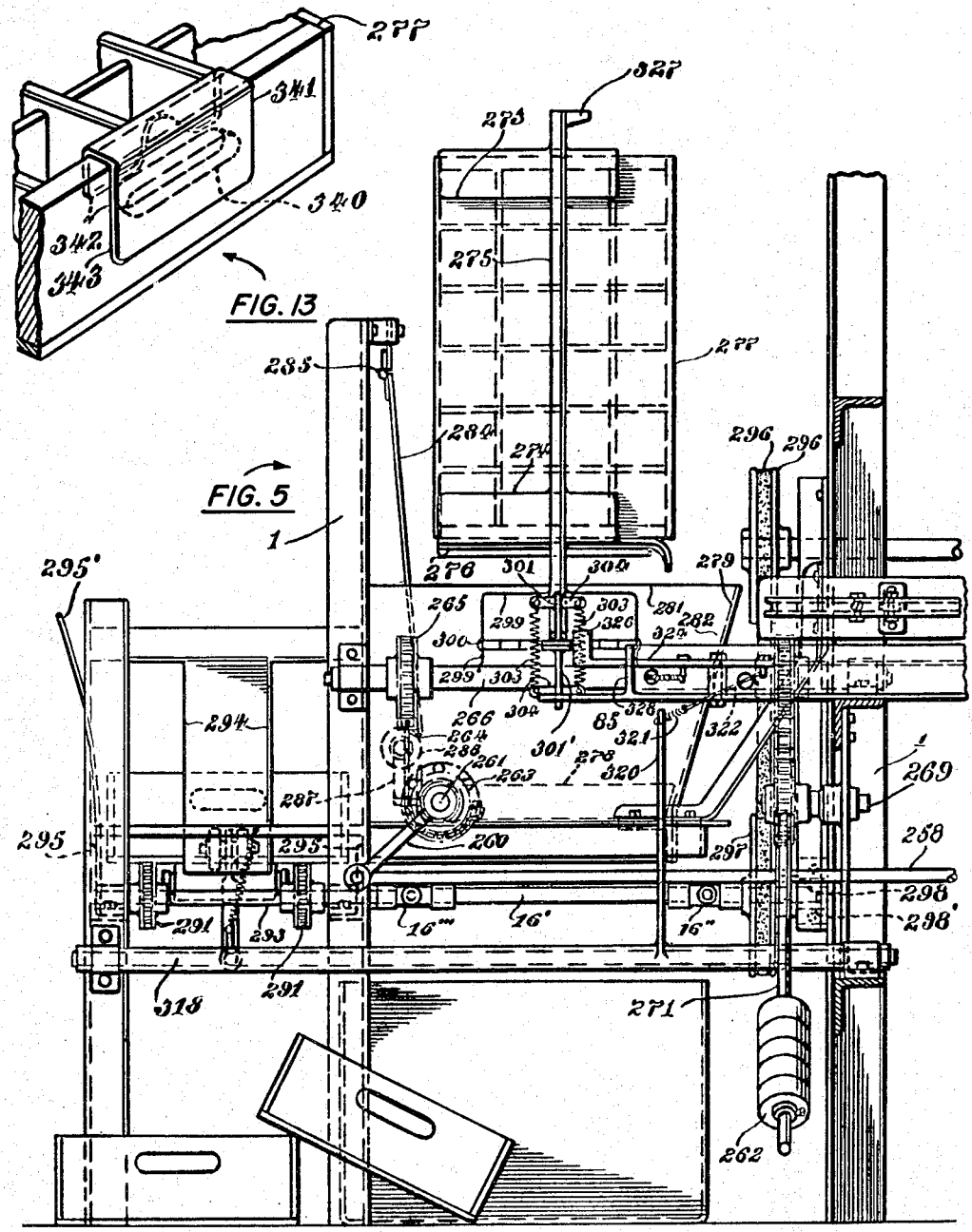

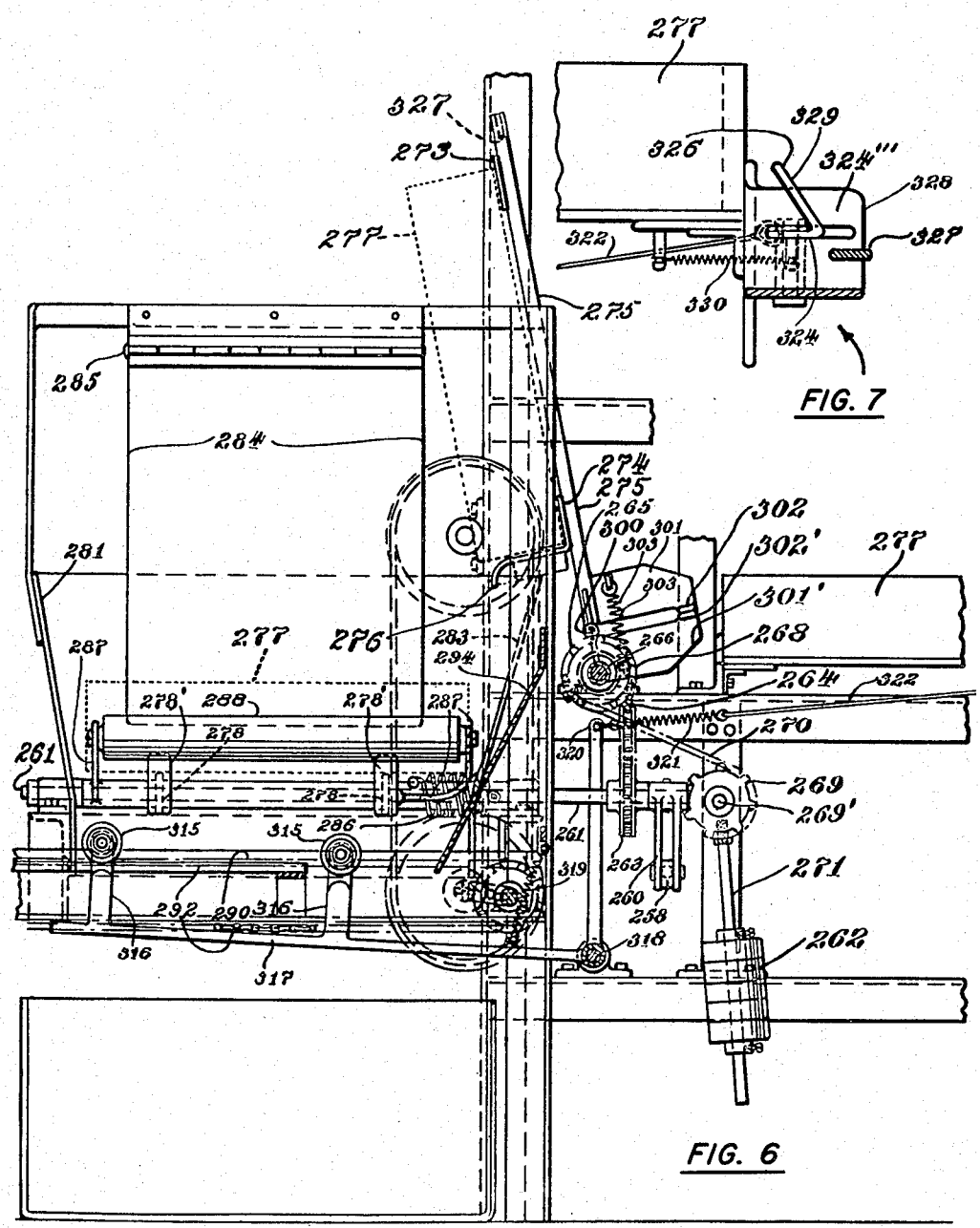

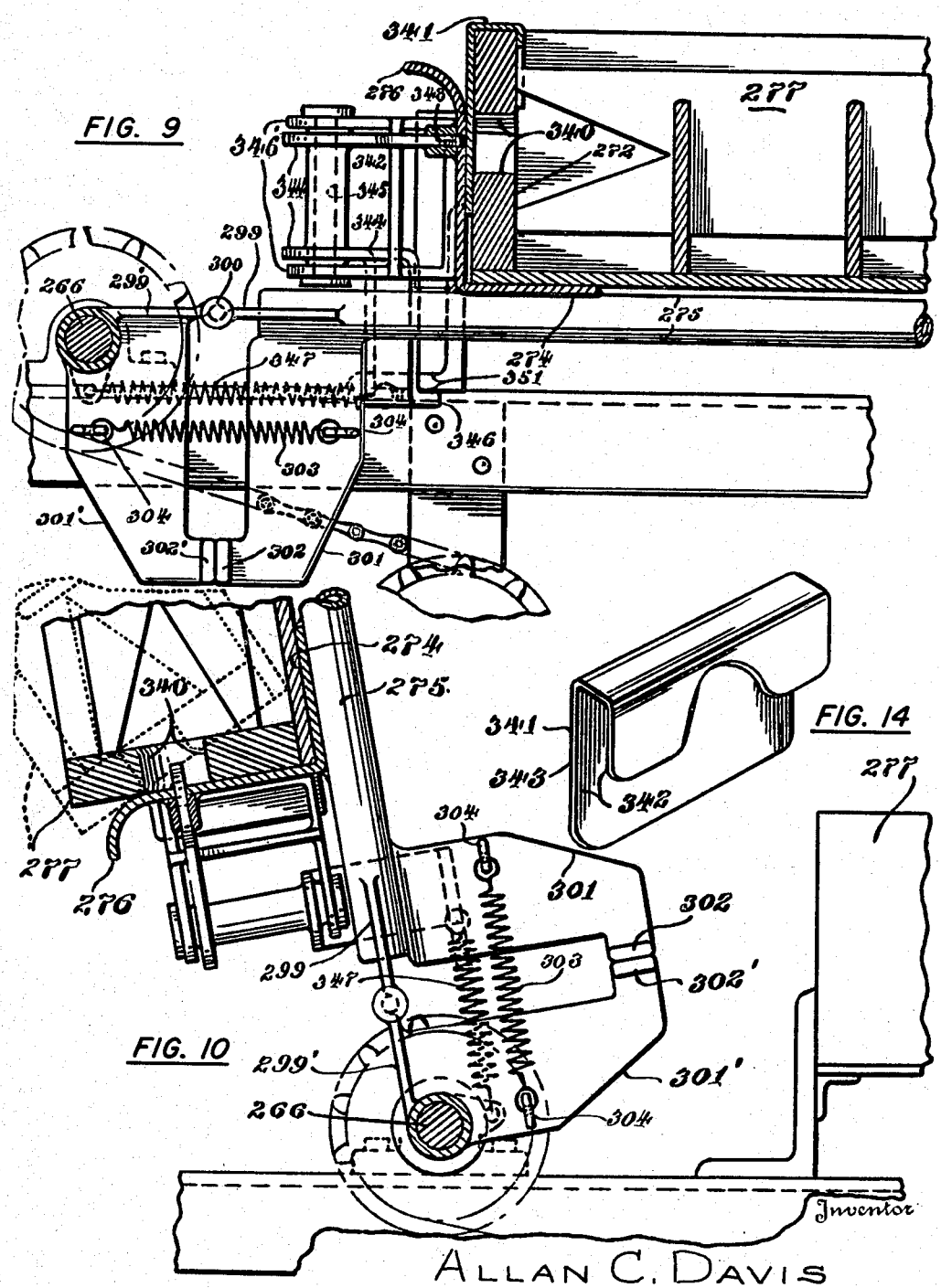

Patented Apr. 15, 1952

2,593,119

UNITED STATES PATENT OFFICE 2,593,119

DEFECTIVE CRATE DETECTOR AND EJECTOR

Allan C. Davis, Baltimore, Md.

Original application December 30, 1942, Serial No. 470,654, now Patent No. 2,400,542, dated May 21, 1946. Divided and this application February 6, 1946, Serial No. 645,931

6 Claims. (Cl. 214—11)

In the bottling of soft drinks, beer and other liquids packed in compartment cases, in which the empty bottles are returned, the removal of the bottles from the cases, and their introduction into the infeed of the bottle washing machine, has involved a hand operation. This operation is slow and expensive and notably inefficient. This hand operation slows down and in various ways reduces the efficiency of the line of machines by which the bottles are washed, filled, inspected and placed in the cases or crates.

The object accomplished by the invention, shown in the co-pending application, Patent Number 2,400,542, dated May 21, 1946, from which the present application is a division, is the provision of an automatic machine to be added to the previously existing line of machines, making it feasible to perform the entire cycle of operations in connection with bottling, case filling, washing and refilling, automatically and with the minimum of supervision. More particularly in the operation of that machine, the compartment cases as received from the retailer, each case containing empty bottles in a series of rows, are placed on a feeding conveyor which feeds the machine, and this machine operating automatically almost without supervision for long periods, lifts the bottles row by row including as few or as many bottles as presented, and places the bottles on a bottle conveyor, from which they are duly transferred to a multiple conveyor which constitutes the infeed of a bottle washing machine, which in turn delivers to a bottle filling machine. Each case is advanced during the period of removal of the bottles therefrom preferably with a step by step motion and in a direction transverse to the case conveyor, variation as to such details being contemplated. Thus each row of bottles is brought in turn within the range of pick up or gripping mechanism, and when each case is thus emptied of bottles it is thereafter advanced most conveniently in the direction of the case infeed to a case clearing mechanism whereby each case in turn is cleared of dirt and other debris, being for this purpose preferably inverted, and thereafter by a second turning operation returned to upright position on a delivery conveyor. There is in the initial inversion just sufficient abruptness of treatment to detach and discharge the dirt and debris without injuring the cases. As they are returned to upright position the cases are placed on a conveyor just referred to as the delivery conveyor, which with the infeed case conveyor is to best advantage timed with the washer and the other machines of the line, particularly the case filling machine. The delivery conveyor according to the preferred arrangement feeds the cases directly to the case filling machine. The length and arrangement of the various intervening conveyors depends on the arrangement of the machines of the line.

In addition to the mechanism for accomplishing the functions above outlined the machine of the invention includes various protective devices to prevent damage to the cases and the piling up of the cases on the delivery conveyor which leads from the present machine to the case filling machine assuming that the present machine is one of a complete line as intended.

The line of automatic machines, to perform the complete bottling and case filling cycle referred to may include as at present intended, a bottle filling machine which delivers to an inspection apparatus and a case filling machine. The present machine would receive the returned cases containing empty bottles, the function of the machine of which this is a division being to remove the bottles from the cases and deliver the bottles to the intake of a washing machine which would in turn deliver the bottles to the bottle filling machine, and the present machine also clears the cases of dirt and debris and delivers the cases to a conveyor by which they are fed to the case filling machine.

The invention forming the subject of this divisional application relates to a detector and ejector for cases other than those used by the bottling establishment, and broken cases.

In the drawings:

Figure 5 is a similar elevation of the rear end of the machine at the rear of Figure 4.

Figure 6 is a rear end elevation looking from the left in Figure 2.

Figure 7 is a rear elevation of the turnover latch taken from line 7—7 in Figure 2.

Figure 9 is a section on the vertical plane showing the first turnover arm and with the detector plate in position.

Figure 10 is a second sectional view on the line 10—10 in Figure 8 showing the first case turnover mechanism in turnover position without the special case detector plate, in this instance the case is partially turned to inverted position.

Figure 13 is a fragmentary perspective view of a case showing the detector cover plate.

Figure 14 is a perspective view of the detector cover plate removed.

Figure 1:
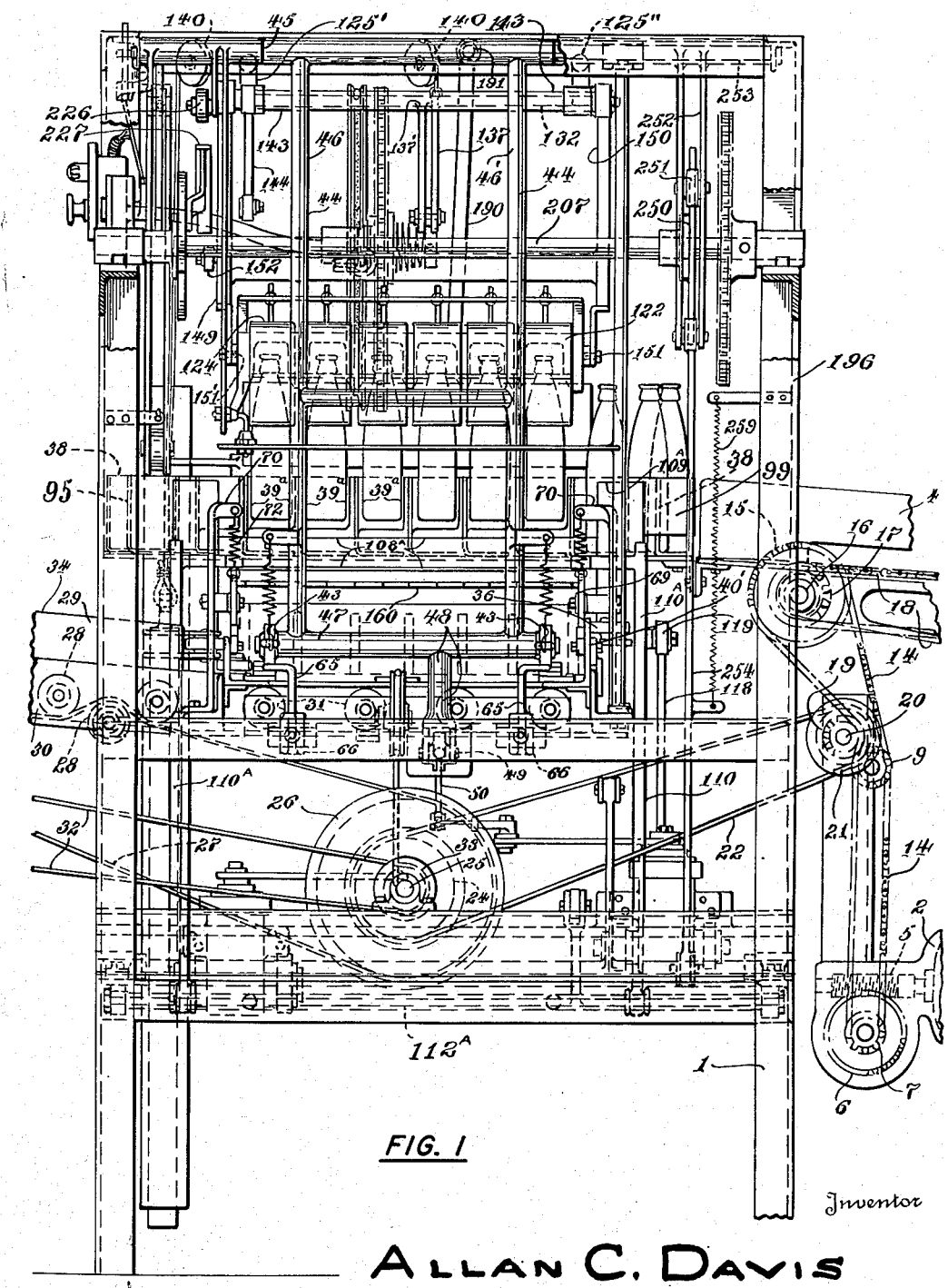
Figure 1 is a front elevation of the machine looking at the end at which the bottles and cases enter.

Referring to the drawings by numerals the frame of the machine is indicated in a general way by reference character 1.

The infeed of the cases from which the bottles are to be removed and the delivery of cases from the machine and other operations at the front end of the machine are preferably performed in time with the bottle washer and for this purpose these mechanisms are preferably connected to the motor 2 shown at the right in Figure 1, and are described in the above mentioned patent. Parts designated by reference characters in the drawings but not described are not necessary for an understanding of the invention claimed herein. Reference is made to the above mentioned patent for a detailed description of these parts.

In the form shown there is a worm drive 5 on or connected to the shaft of the motor. This worm drives the worm wheel 6, the shaft of which carries or drives a small sprocket 7, which in turn drives a chain 14 which engages and operates a sprocket 9 spaced upwardly above the sprocket 7. Sprocket 9 is an idler for spacing the flights of the chain.

After the filled cases have been advanced and as each case is emptied in the bottle take up position on rollers 31 and moves backwardly as each row of bottles is removed, it pushes the previously emptied cases backwardly through the machine forming a continuous line of cases moving through the machine to the case turn over and discharge at the rear end of the machine.

For this purpose the path of the cases through the machine backwardly from the bottle take up position is defined by a line of anti-friction rollers 81 arranged with their axes horizontal and transverse to the length of the machine. These rollers may be rotatively supported in a pair of angle irons 82 arranged in parallel and extending backwardly on each side of the path thus identified. These rollers are shown in end elevation in Figures 3 and 4.

In the form shown there are two sets of short rollers 81, one at each side of the path of the cases having their journals seated in the upright flanges of angle irons 82. In this way the center of the machine is made more accessible particularly from beneath. The extension of the rollers across the entire path of the cases is regarded as undesirable in the particular form of machine shown.

Figure 3:
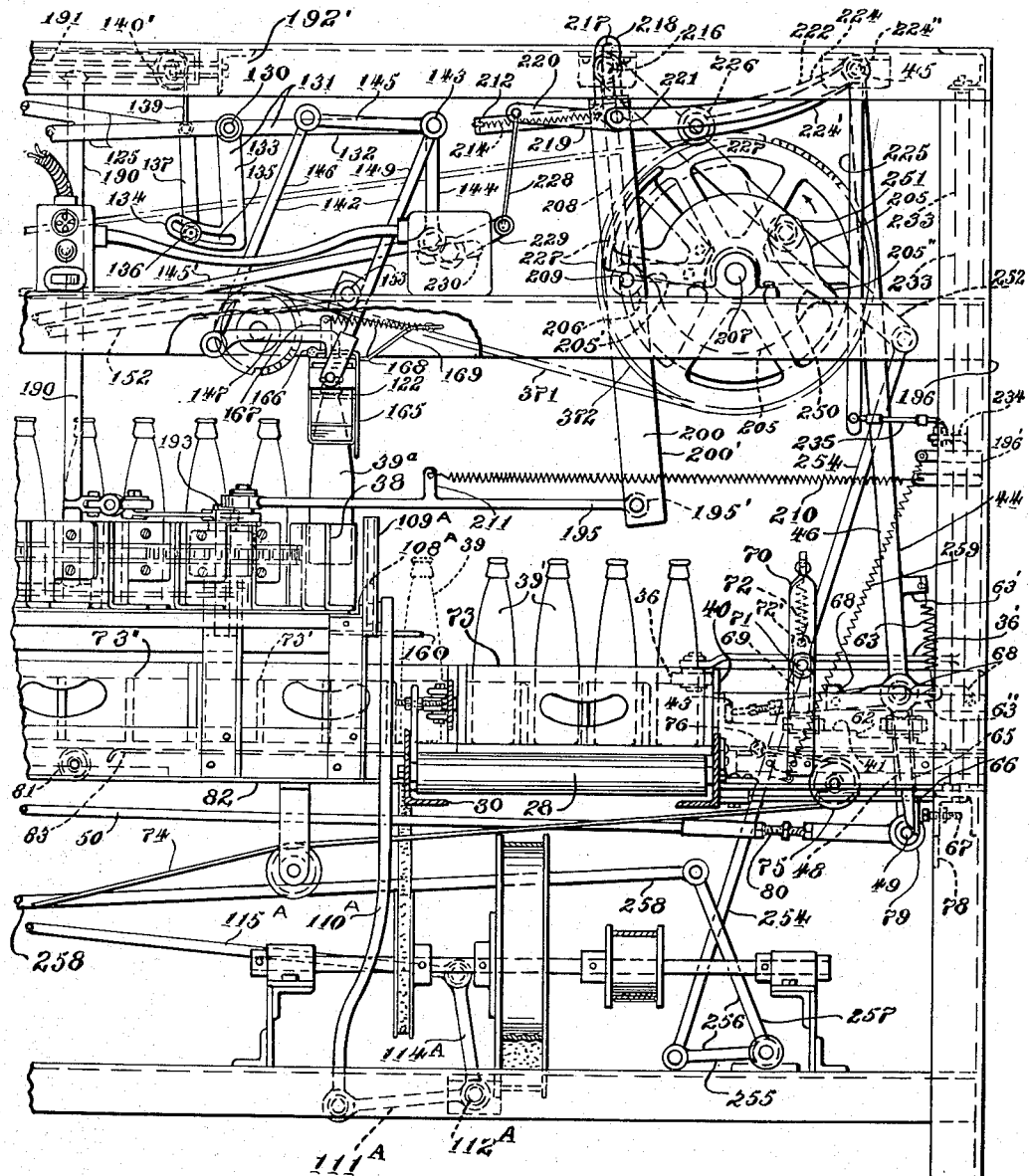
Figure 3 is a side elevation looking from the left in Figure 1 showing the front end of the machine, the infeed case conveyor and support being in section.
Figure 4:
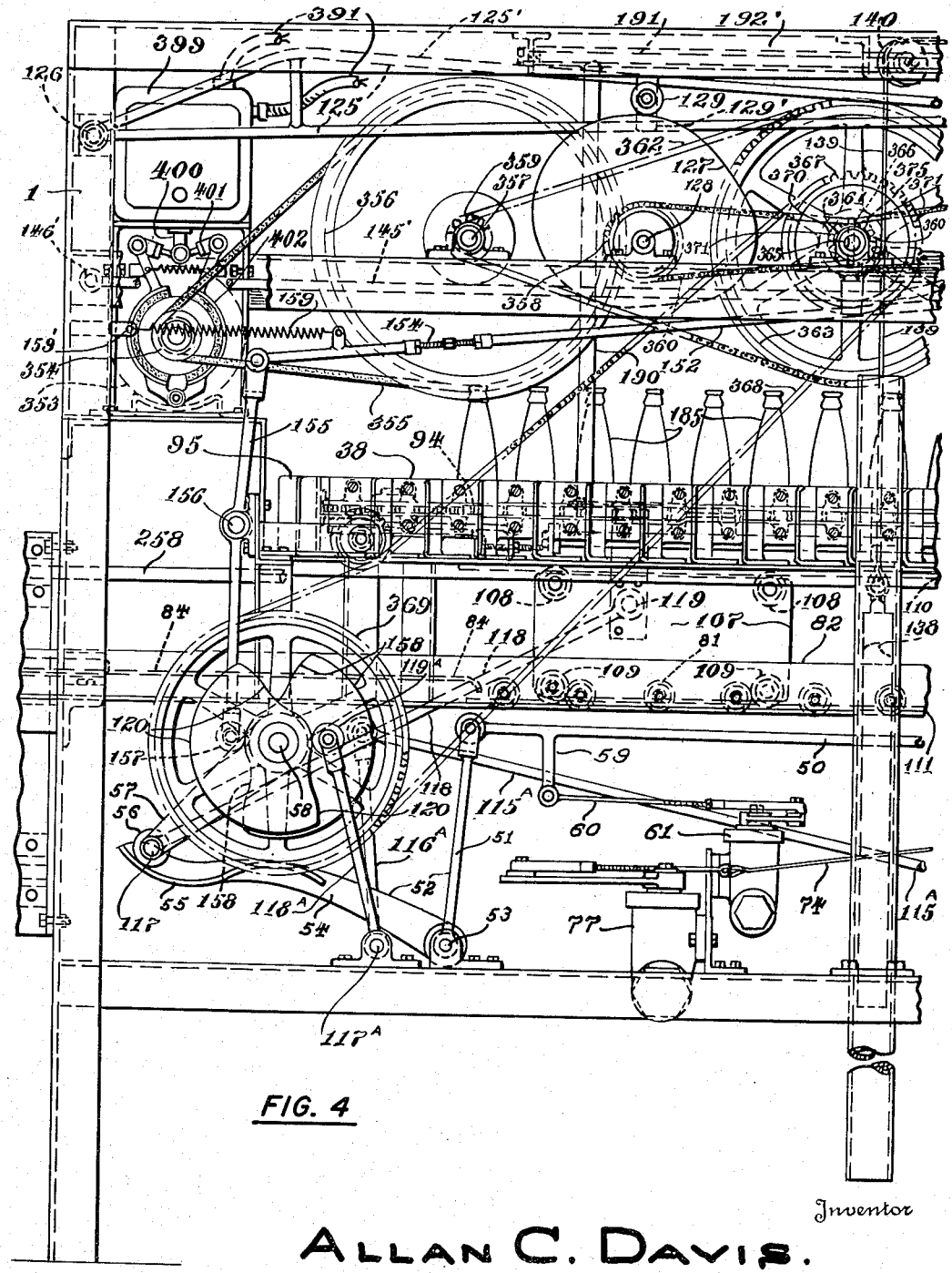
Figure 4 is a side elevation constituting a continuation to the left of Figure 3 and is a part of the machine just to the rear of that part shown in Figure 3.

At the extreme forward end of said path of the cases just rearwardly of the bottle take up position on the rollers 31, supporting plate 83, see Figure 3, has been shown instead of anti-friction rollers and at the rear end of the path the drawing shows supporting plates 84, Figure 4.

Figure 2:
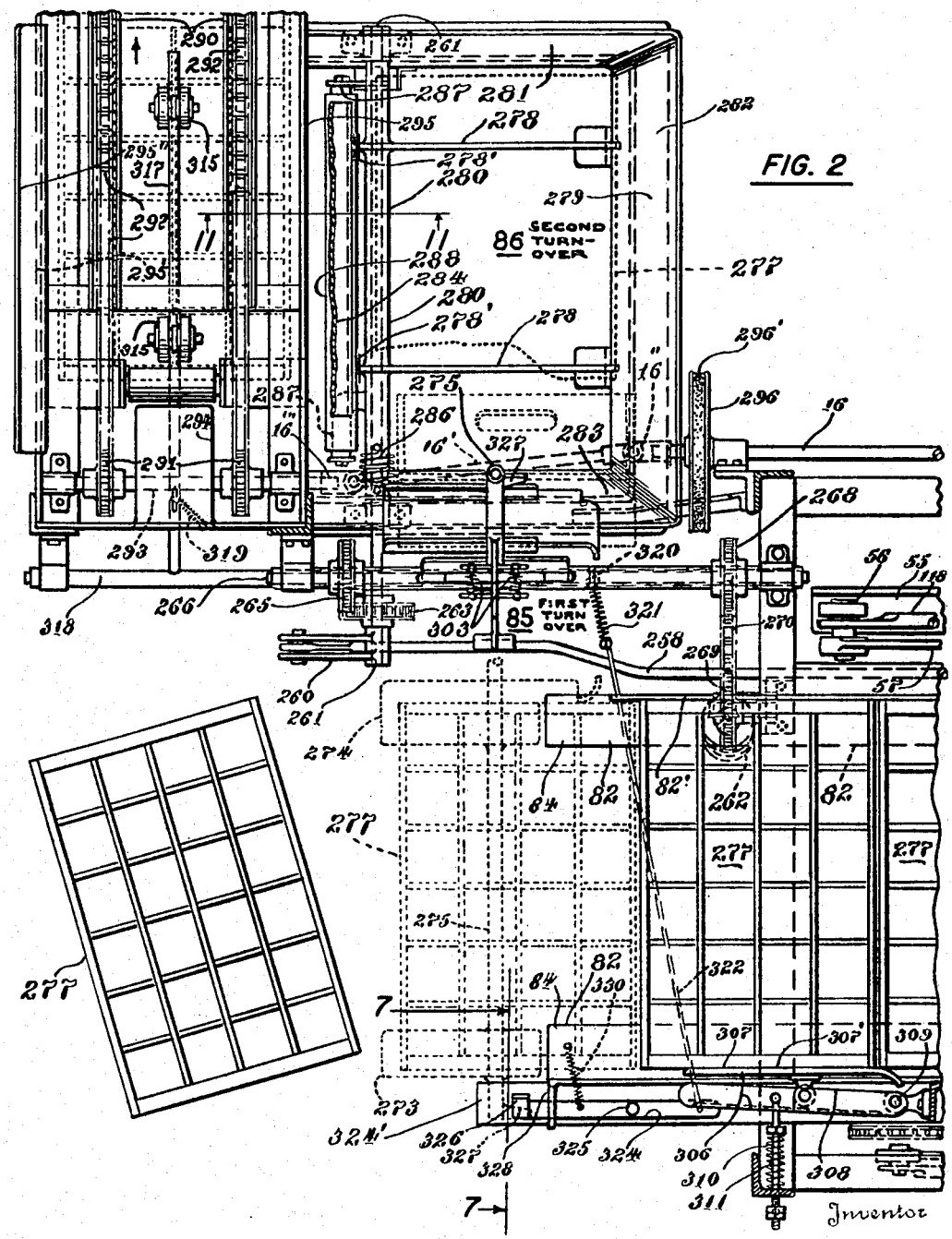
Figure 2 is a plan view of the rear end of the machine showing the turning or inversion and delivery of the cases.

At the extreme rear end of this path there is a case turning mechanism or assembly 85 Figure 2 whereby the cases are turned through an arc of 180° in a vertical plane at right angles to the direction of the path just described said plane being parallel to the axes of the anti-friction rollers 81.

The cases are thus placed in inverted position on the second turn over mechanism, the second turn over assembly being indicated by reference character 86. This second turn over mechanism turns the cases through an arc of 180° in a vertical plane parallel to the path of the cases through the machine as on rollers 81 and plates 83 and 84. This second turn over assembly places the empty cases in upright position on a delivery conveyor 290 which in the preferred practice leads to the case conveyor of a case filling machine by which the filled bottles are loaded into the cases for delivery.

In the form of machine illustrated this delivery conveyor is of the chain type driven by sprockets 291 which are mounted on a shaft 293 which as shown is connected by universal joints 16''' and 16'' and shaft 16' to the shaft 16, the front end of which is shown in Figure 1 as having thereon sprocket 15 driven by chain 14 and cooperating sprockets 7 and 9 from the worm wheel 6 which is operated from the shaft of the motor 2 which drives the bottle washing machine to which the empty bottles are delivered by the machine under discussion.

The respective first and second case turning assemblies will be further discussed. It is of importance that in the first turning operation performed by assembly 85 in which the cases are inverted from upright position, they are handled with just sufficient abruptness to dislodge the dirt and debris collected during shipment and during the sale of the bottled goods and in returning the empty bottles and this handling is not sufficiently abrupt to destroy or injure the cases.

The second turn over 86 returns the cases to upright position and places them on the delivery conveyor ready to be presented to the case filling machine.

The handling and treatment of the empty cases, boxes or crates after they leave the bottle take up position on rollers 31 where the bottles are removed, will now be discussed.

As already pointed out the empty cases move rearwardly on rollers 81 or other conveyor, and in the form of the machine shown these cases normally form a continuous line with each case in side to side contact with the next. The anti-friction rollers 81, Figure 4, support the line of cases and the step by step motion imparted to each case in turn in take up position on rollers 31, is communicated from this case to the one next to the rear and previously emptied and from this case to the next and so on through the entire line so that the entire line is moved with the same step by step motion. This arrangement is mainly for convenience and simplicity other case advancing means being usable.

At the rear end of the machine the cases are inverted with just the right degree of abruptness to dislodge and release the dirt and debris and thereafter each case is returned to upright position and advanced toward the case filling machine.

In the form shown there is means at the rear end of the machine for detecting and discharging from the end of said line, cases which are regarded as unsuitable for refilling or which are different in some feature or detail from the regular run of cases.

In Figure 1 there is shown a case turnover cam 250 mounted on cam shaft 207 also shown at the upper right in Figure 3. This shaft as hereinafter described rotates once for each four or any suitable number of bottle row take up cycles, according to the number of rows in a case. Cam 250 engages a follower roller 251 mounted intermediately of the length of an arm 252 shown as pivotally mounted at its upper end on a transverse shaft 253, Figure 1, supported in the top portion of the frame. Said arm swings in a fore and aft plane. This arm 252 is shown as bifurcated, straddling the cam 250, and the cam roller 251 is between the bifurcations. A connecting rod 254 partially supported by spring 259 is pivotally connected to the lower end of arm 252. The rod 254 extends downwardly and rearwardly and is connected at its lower end to the approximately horizontal arm 255 of a bell crank lever 256 having a fore and aft oscillating arm 257 shown as approximately upright. This arm 257 is connected at its swinging end to an elongated fore and aft extending connecting rod 258 which extends almost the entire length of the machine, being shown in Figure 3 and at the rear of the machine in Figures 2, 5 and 6. At its extreme rear end this connecting rod 258 is connected to and operates a crank 260 which is secured to a transverse shaft 261 which is oscillated by said crank once in each four bottle row lifting cycles, and in accordance with the present embodiment, after the stroke which removes the last row from each case. The follower 251 is in fact, in the form shown, held in contact with or caused to normally contact cam 250 by a weight 262 shown in the side elevation, Figure 5. The first case turn over operation to be described is in fact energized by the weight 262 and timed by the cam 250, i. e., the weight which is adjustable as to position on arm 271 or as to its amount to compensate for variation in weight of the cases is raised by the cam to a position from which it falls or swings downwardly turning the case and this downward swing of the weight and turning of the case is timed by cam 250.

More particularly the oscillating cross shaft 261 in the form shown has secured thereto a sprocket 263 oscillating in a fore and aft vertical plane and this sprocket is connected by a chain 264 to a sprocket 265 secured to and serving to oscillate a longitudinal shaft 266 which is in a higher horizontal plane than shaft 261, see Figures 2 and 6. This chain is not endless but is secured at its opposite ends to the respective sprockets 263 and 265 and wrapped partially around same, the motion of both shafts being oscillatory and not rotary. Shaft 266 is similarly connected by sprockets 268 and 269 and a single chain 270 to the swinging weight 262 which is mounted on a radial arm secured to the latter sprocket which is mounted on a short shaft 269' having a single bearing in the frame. The said chain 270 has two ends, each end portion being secured to and wound partially about a corresponding sprocket. The mechanism just described connects the weight 262 to cam follower 251 and vice versa.

Weight 262 tends with some interruptions by mechanism to be described, to hold follower 251 in contact with cam 250. The weight 262 in swinging downwardly operates the first case turnover; cam 250 returning or raising the weight and returning the parts to initial position and the second turnover is operated directly by the cam as it raises the weight. The latter operation is therefore relatively positive, and said respective turnovers occur in sequence.

The cases in their progress through the machine form a closed line extending rearwardly, as described from the rollers 31 which support the cases in turn in take up position along plates 83, Figure 3, rollers 81 and ways or plates 84, Figure 4, on which they are guided by the upright flanges or plates 82. As they reach and extend beyond the latter plates they rest on the case supporting or turning plates 273, 274 shown in broken lines in Figure 2, and in full lines, Figure 5. These plates 273 and 274 are shown as mounted on a radial arm 275 connected to shaft 266 in a manner to be described. In the first turning operation, i. e., as each case is inverted, these plates swing upwardly about the axis of shaft 266 as it is oscillated by the downward swing of weight 262. This arm 275 is normally horizontal and is raised, preferably after each case is emptied or at suitable intervals as determined by cam 250 through the connections shown, or such other suitable connection as may be provided, the timing being essentially in correspondence with the emptying of the cases. It may be noted that plate 274 adjacent to shaft 266 has a normally upright fore and aft extending flange 276 which prevents the case 277 thereon from sliding toward shaft 266 as the case is turned upwardly.

The arm 275 in the form shown has a hinged or other swinging relation to the shaft 266 having stop means whereby it is prevented from yielding backwardly or downwardly beyond a predetermined position under the weight of the case being turned, and springs for restraining and opposing its forward motion holding it normally in backward position against the stop. As pointed out the lifting or initial 90° swing of the first turning motion is imparted by weight 262 and therefore cannot crush the cases if they should become jammed in this part of the turning operation. On the other hand if by any chance a case should advance on ways 84 beneath the arm 275 the arm yields upwardly without harmful result.

The mechanism shown is as follows. Plate 299 approximately radially related to shaft 266, see Figure 9, has the arm 275 rigidly secured thereto or integral therewith. This plate 299 is connected to a plate like lug 299' carried by shaft 266 by hinge 300 having its axis parallel to shaft 266. Both plates 299 and 299' have projecting fins or webs 301 and 301' transverse to said plates 299 and 299' and shaft 266, see Figures 2 and 5. The fins 301 and 301' project downwardly when arm 275 is horizontal, see Figure 9. Fin 301' is rigid with shaft 266 and fin 301 with arm 275, see Figures 5, 6 and 9, and these fins have near their radially outer ends stops or stop plates 302 and 302' which are held normally in contact by tension springs 303 one on each side of said fins 301, 301'. Said springs are connected at each end to lugs 304 projecting from fins 301 and 301' respectively and tend to hold stops 302 and 302' in contact each with the other. Springs 303 thus tend to hold arm 275 in normally fixed relation to shaft 266 and permit it to yield in left handed rotation as seen in Figure 6. Stops 302 prevent arm 275 from yielding downwardly in the lifting operation giving it a normally fixed relation to shaft 266 providing for a positive lifting of the case by weight 262, which prevents crushing in case of obstruction of the case turning path, and the spring connection provides for an upward forward yielding of arm 275 when the downward motion of the arm 275 is obstructed as by the premature advancement of a case beneath said arm.

To prevent irregular or premature advancement of cases into said position and to keep a full line of cases on ways 84 and rollers 81 a case brake 306 has been provided shown in plan, Figure 2. This brake, as shown, the details of the various mechanisms being subject to variation consists of a brake shoe 307, extending in a fore and aft direction of the machine, i. e., parallel to said step by step motion, and having its case contacting face 307' similarly disposed. This brake shoe as shown is pivotally mounted near its fore and aft center on a lever 308 which swings horizontally and transversely of the machine being in turn pivotally mounted on the frame 1 at 309 at its forward end. The lever 308 carrying shoe 307 is yieldingly advanced by a spring 310 shown as enclosing a sliding guide rod 311 which also limits the advancement of this lever 308 and shoe 307.

The second turnover as shown comprises arms 278 extending in a direction which is longitudinally related to the machine. These arms are mounted on and radiate from a sleeve 280 on transverse horizontal shaft 261. These arms in their horizontal or depressed position as shown in Figure 2 are at the bottom of a case guiding funnel 279 which is shown as having three rigid sides 281, 282, 283 and a swinging transverse side 284 forming the rear side of said funnel. This member 284 is pivotally or hingedly supported at its upper edge at 285 on a rigid portion of the frame 1 whereby the said flap or funnel side 284 swings in a fore and aft direction as related to the passage of the line of cases through the machine. The sleeve 280 carrying the arms 278 is flexibly connected by coil spring 286 to shaft 261 on which the said sleeve is mounted and said sleeve is provided with offset or other suitable arms 287 which may be integral with arms 278 and at right angles thereto extending upwardly when arms 278 are depressed or horizontal. These latter arms 287 carry at their swinging ends a transverse fulcrum roller or equivalent member 288 on the forward side of which the bottom edge of flap 284 rests in the position of roller 288 and arms 278 just described and also shown in Figures 2, 5 and 6 in which figures it may be noted that the first turnover arm 275 as shown in full lines is elevated, i. e., is at or near the end of the first turning operation. At this time arms 278 are in horizontal position to receive the case thus turned and roller 288 which swings about shaft 261 in the 90° relation shown in Figure 5 is elevated, holding the flap 284 or rearward wall of funnel 279 in the forwardly and downwardly inclined position shown, whereby the inverted case will be guided downwardly to arms 278. The case is thus turned through the first 180° of the turning operation being dropped with emphasis on the arms 278 tending to remove all dirt and debris.

It will be noted from Figure 5 that the depending arm 260 of transverse shaft 261 is in its rear-most position which corresponds to the position of first turnover arm 275 and second turnover arms 278 and roller 288 as therein shown. In this position the first turnover arm 275 is beyond the upright at the end of its stroke ready to drop the case 277 in inverted position and the second turnover arms 278 are horizontal ready to receive the turned case. It may also be noted that cam follower roller 251, Figure 3, is in the corresponding depression of cam 250 and the line of cases 73, 73' is stationary as follower 56 approaches shoe 55. Continued rotation of said cam expels the follower 251, drawing the connecting rod 258 forwardly, i. e., to the right in Figures 5 and 6 effecting a corresponding motion of arm 260 and shaft 261 and hence of shaft 266 through the connections previously described.

Thus arm 275 is lowered to horizontal position in which case turnover supporting plates 273 and 274 are in line with the case ways 84 and ready to receive another case 277 advanced by the step by step motion. At the same time and by the same motion of crank 260 and shaft 261, which in the particular mechanism shown is actuated by cam 250 through spring 286, and the positive connection described, the arms 278 are raised to upright position in the second turnover operation, again turning the case 277 through 180° so that it is returned from its bottom up position, in which it was received on arms 278, to normal or bottom downward position on the case delivery conveyor 290, which in the line of machines previously described would deliver the cases directly or indirectly to a case filling machine. This conveyor is shown as transversely related to the line of cases in the present machine.

The roller 288 swings rearwardly and downwardly as the second turnover arms 278 swing upwardly said fulcrum being spaced upwardly from arms 278 in the horizontal position of the latter and 90° therefrom in an arc about shaft 261. Lugs 278' are slightly forward of rollers 288 in the horizontal position of arms 278. As the said arms are raised to or slightly beyond the vertical, the rear lower corner of the case rests in the angle between said lugs and arms and the case rocks about this corner its rear side wall 277' turning with and about said fulcrum 288. As roller 251 again enters the depression of cam 250, and arms 278 return to the horizontal position which occurs when another case has been emptied, roller fulcrum 288 swings back to the position Figure 5 in which the arms 287 on which it is supported are upright and said detent or roller is above the supporting plane of arms 278. In this position the flap or hinged plate 284 is in the case guiding position, Figure 5, from which it swings to the left releasing the case as the fulcrum 288 swings downwardly to the left in Figure 5 in the second turning operation.

As each case approaches the conveyor 290 it receives an impetus in the direction of advancement of said conveyor 290 from the inclined plate or chute 294 which is inclined downwardly and forwardly in the direction of motion of conveyor 290 as indicated by the arrow thereon. This impetus serves to overcome the inertia of each case in turn and to prevent slipping of the cases on the conveyor 290, whereby each case in turn moves forwardly with conveyor 290 giving a relatively uniform initial advancement of each case whereby piling up of cases at this point is prevented and the cases are located on the conveyor end to end without shock. It is of importance that each case 277 is inverted in the initial turning operation and landed in inverted position with sufficient abruptness to dislodge the dirt and debris which is thus discharged and spilled downwardly but is not handled with sufficient violence to damage the cases through a long period of use. The turning to upright position on the conveyor is performed immediately but preferably without excessive abruptness.

Conveyor 290 may be timed and operated in any suitable manner. In the form shown, see Figure 2, it is operated by shaft 16 driven from and in time with the bottle washing machine motor and hence in time with said washing machine which should be timed with the other machine of the line. Shaft 16 extends rearwardly from the front of the machine as previously described. In the form shown this shaft carries at its rear end a pulley 296 driving a belt 296' which drives a pulley 297, Figure 5, on a short shaft 298 supported in a suitable bearing 298' on the frame 1. This shaft is connected by a universal joint 16'' to the shaft 16' and a similar joint 16''' at its rear end provides a driving connection to conveyor sprocket shaft 293 which carries and drives conveyor sprockets 291 which drive the chains 292 of said conveyor 290. Conveyor 290 is shown as having side guides 295 and 295' in the form of angle irons, shown in plan, Figure 2. The outer guide 295' carries a downwardly and forwardly inclined funnel plate 295''.

Figure 2 shows in plan and Figure 6 in rear elevation a detector mechanism operating a stop motion whereby the turnover operation is deferred when there is a case on conveyor 290 in the receiving position to which the cases are discharged from the second turnover arms 278. When the first turnover operation is thus deferred the case fed rearwardly from ways 84 over the turnover plates 273, 274 is passed rearwardly and caused to go beyond said plates 273, 274 being thus discharged from the machine and dropped as in Figure 2. This prevents piling up of cases on the conveyor 290. It is of interest that the difficulty referred to and hence this discharge of cases is of infrequent occurrence amounting to usually one or two cases a day. The discharge of such a small proportion of the cases is insignificant, there being a corresponding consumption of bottles due to breakage by dropping from the various conveyors between the machines of the line and to removal during inspection, etc.

This detector and safety discharge device for the cases, in the form shown, comprises detector member or roller 315, see Figures 2 and 6. These detectors or detector rollers 315 are shown in Figure 6 as mounted on uprights 316 carried by and extending upwardly from a transverse swinging arm 317, radiating from and secured to a longitudinal shaft 318. This arm 317 is normally supported by a spring 319 which gives it a yielding upward tendency whereby rollers or detector members 315 normally project upwardly between the chains 292 of case delivery conveyor 290. The shaft 318 also carries rigidly secured thereto or integral therewith an upright arm 320 yieldingly connected at its upper end as by light tension spring 321 and connecting rod 322 to a fore and aft extending latch lever 324 shown as mounted to swing in a horizontal plane about a central pivot 325 projecting upwardly from a horizontal plate 324' secured to the frame. Lever 324 has at its rear end a detent 326, adapted to engage a forwardly extending lug 327 on the first case turnover arm 275 as best shown in Figure 5. The latch lever 324 is moved in latching direction, i. e., to right in Figure 7, by said spring 321 and rod 322 and arm 320 as hereinafter described.

The latch 326 is shown in transverse sectional elevation looking forwardly in Figure 7 being shown in released position, i. e., lever 275 is in lowered or horizontal position and latch 326 has been advanced from its engaged position to the left in Figure 7 which is away from the observer in Figure 2.

It may be noted that latch lever 324 swings in a slot 324''' in a transverse plate 328 secured to the frame, Figures 2 and 7. In the form shown detent 326 on lever 324 has a cam surface 329 which, when engaged by the lug 327 on turnover lever 275 in the return or downward stroke of the latter moves latch lever 324 to the left in Figures 6 and 7 out of the path of lug 327 permitting the lever 275 to move to its fully depressed or horizontal position as in an instance when there is a case on rollers 315 when the lever 275 reaches the end of its return stroke and is ready to receive a case. This latch 324, 326, 327 is normally released by spring 330, Figures 2 and 7 which tends to hold the parts in the position, Figure 7, spring 319 assisting.

It is of interest that as stated in the description and shown in the drawing of cam 250 that the first and second turnover operations take place in the machine shown in quick succession and that if the first turnover operation takes place when there is a case on conveyor 290 in the position in which it overlies the rollers 315, there is danger of piling the cases one on top of the other on said conveyor. The tendency to piling up is obviously harmful in its effect on the case filling machine operation and is eliminated by the case detector, turnover latch mechanism. Whenever there is a case on conveyor 290 in the position described rollers 315 and lever arm 317 are depressed by the weight of the case stretching spring 319 which is of suitable tension for this purpose. Also the shaft 318 is turned to the left by arm 317 as seen in Figure 6 and upright lever 320 is turned counter clockwise in Figure 6. This applies tension to spring 321 and rod 322, swinging the latch lever 324 counter clockwise as seen in plan, Figure 2, stretching spring 330 which tends to hold the latch lever 324 in the position shown in Figure 7. The counter clockwise motion of lever 324, see Figures 2 and 7, engages the latch 326 with lug 327 on lever 275 and the latch remains engaged so long as there is a case in the position overlying rollers 315. As soon as this case on rollers 315 is advanced or removed, if it should prove to be jammed, rollers 315 and lever arm 347 rise by action of the springs 319, 330, and 321 and latch 324, 326, 327 is released.

In the meanwhile the advancement of the cases would normally continue, the case or the successive cases at the rear end of the line being pushed over and off of turnover plates 273, 274 on to the floor or into a receptacle suitably placed so long as the latch remains engaged.

When the obstruction or jammed case on the ways 290 which is engaging rollers 315 is removed or advanced the turnover latch is released and the regular operation of the machine is continued. One purpose of this detector controlled latch is to prevent piling up of the cases on the delivery conveyor in case of a stoppage or slowing down of the case filling machine and a consequent failure to take cases from case delivery conveyor 290. The intake end of the machine and the delivery conveyor are intended to be so timed as to keep the washer full of bottles.

It is regarded as of advantage in connection with the first and second case turning operation that the respective case turnover arms or levers swing to a position only slightly beyond the vertical, in the form shown about 15° and the upper edge of the case in this position being the outer edge in a radial direction from the axis of the arm upon which the case is being turned has a greater momentum than the opposite or inner edge the rotation of the case about said inner edge continues until the case is turned through a 180° angle and falls free of the turnover fulcrum support 276 in the first turnover and 288 and 278' in the second turnover.

Figures 11, 12:
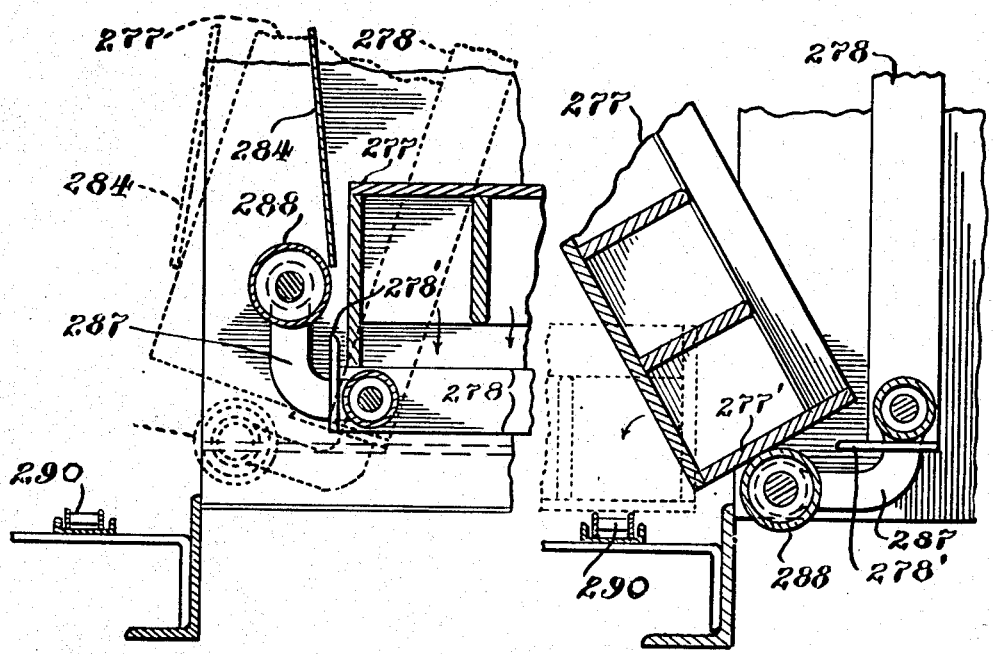
Figure 11 is a section on the vertical plane indicated by line 11—11 in Figure 2 showing the second turnover mechanism with a case thereon ready to be turned to upright position on the case delivery conveyor.
Figure 12 is a section on the same plane showing the case turned beyond 90° position and ready to drop in upright position on the case delivery conveyor.

Figures 10, 11 and 12 illustrate the rolling of the cases about said fulcrums and Figure 11 also illustrates in full and broken lines respectively the successive positions of hinged plate or funnel side 284 and roller 288. The latter is lowered releasing said member 288 and hence the case as the turning operation progresses.

In the filling of cases it is frequently desirable to avoid using cases other than those identified with the proprietor of the particular brand being handled and for various reasons it may be desirable to select and remove some of the cases returned by a retailer. The cases returned to a bottling plant normally contain a quota of empty bottles and these bottles are most conveniently removed by passing the case through a machine of the kind herein described. For convenience cases to be thus excluded will be referred to as foreign cases which term may also include excessively dirty and broken cases. All of these cases have hand holes 340 located approximately as indicated in Figures 8 and 9.

For the purpose of excluding foreign cases according to the preferred form shown, the attendant who is placing the cases of bottles on in-feed conveyor 29 is supplied with suitable means for marking cases to be separated from the main supply. In the form shown this is for temporarily closing the hand holes 340 of the cases selected by him to be excluded. Figure 14 shows for this purpose a U-shaped cover plate 341 having the space 342 between the legs of the U of sufficient width to permit the plate to fit over the case wall, closing the hand hole, it being understood that the sheet metal comprising plates 341 is resilient and bendable to fit practically any such case wall to advantage. One leg or depending plate member 343 may be longer than the other and adapted to cover the handle opening from the outside. It may be of interest that the variation in thickness of these crates or case walls has been found negligible.

Figure 8:
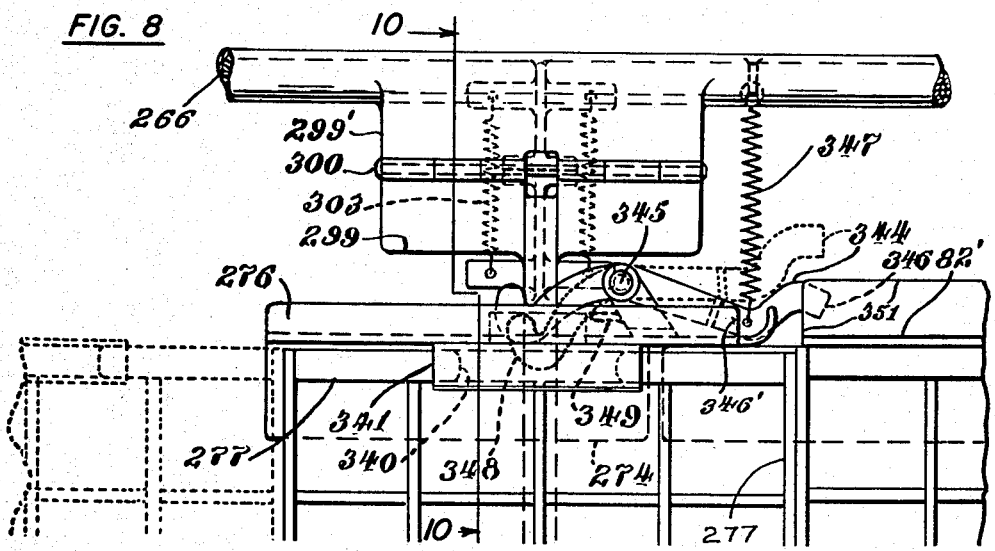
Figure 8 is a fragmentary top plan view of the first case turnover mechanism as in Figure 2 showing the addition thereto of a special case detector for detecting and ejecting special cases different from others being handled.

When the attendant notices a case which should be excluded, i. e., a foreign case, he applies a plate 341 so that it covers the handle opening, in the manner shown in Figures 13, 8 and 9. In the form of machine shown the cover plate should be applied to the forward wall of the case as it moves along conveyor 29, i. e., the wall which is ahead in the direction of motion toward rollers 31.

The foreign case detector mechanism is shown in plan in Figure 8 and in transverse vertical section in Figure 9. This consists in the form shown of a lever 344 pivotally mounted near its center, Figure 8 on an upright axis to swing in a horizontal plane. This pivot 345 is seated at its lower end in a bracket 346' which projects outwardly, i. e., away from the case path, from the upright flange 376 of first turnover case support 274. In the horizontal position of arm 275 shown in Figure 8 the pivot 345 is approximately vertical and lever 344 swings in a horizontal plane. This lever may to advantage be shaped as shown being conveniently of an arcuate or concave outline with the pivot near the center and the convex side toward the case path X which extends longitudinally of the machine. The tail 346 of the lever is disposed toward the front of the machine and, as shown, a tension spring 347 is connected to the first turnover shaft 266 and to the said lever tail 346 tending to advance the projecting head portion 348 and press it against the end wall 277' of the case. It may be noted that as the cases approach this position they are pressed against guide 82' by the presser foot or brake shoe 307, Figure 2, and likewise against flange 276 of the first turnover.

When a case, having the handle hole 340 open, reaches the position 277", Figure 8, the head 348 enters the handle hole 346 and the lever assumes the broken line position Figure 8 in which it is located by stop 349. In this position the tail 346 clears the detent 351 on the frame provided for a purpose to be described.

When a case with the cover plate 341 applied thereto as shown reaches this position the lever head 348 rests on the cover plate, being excluded from the handle hole, whereby lever 344 is swung against the tension of spring 347 to the full line position, Figure 8. In this position of the foreign case detector lever 344, the first turnover arm 275 is locked by the engagement of said lever with said detent and is not operated by weight 262, Figure 6 or otherwise to turn the case, which is therefore advanced and dropped from the machine. In this instance tail 346 engaging detent plate 351 from beneath, locks the turnover. The presser foot 307 tends to hold all cases against the flanges or guides 82' and 276 so there is no tendency of the cases to stand off from these members causing failure to operate the stop when a cover plate 341 is in place.

Thus the attendant may so control selected foreign cases that the machine may be used to remove the bottles and advance them to the washer the foreign cases being thereafter excluded from the line going to the case filling machine.

I have thus described a machine embodying the invention, the description being specific and in minute detail in order that the construction and operation of a machine embodying the various features of the invention may be fully disclosed for the benefit of those familiar with case filling and similar machines and hence able to understand this machine: however the specific terms herein are used in a descriptive rather than in a limiting sense, the construction disclosed being regarded as a practical embodiment of the invention of which other forms are contemplated.

What I claim as new and desire to secure by Letters Patent is:

1. In a machine of the type described, means for moving open top cases on a predetermined path and means adjacent said path for inverting the cases to remove dirt therefrom, separate means for returning the cases to upright position and means for delivering them from said latter turning means, a case identifying device adapted to be placed on certain cases by the attendant, detector means operated by said identifying device and means controlled by said detector for preventing the operation of one turnover mechanism whereby cases thus identified are separated from the turned cases.

2. A case conveying and transfer mechanism comprising a way along which rectangular end hand-holed cases move, with the holes extending sidewise outwardly, removing means in the path of the cases to remove the cases from the ways, said removing means being adapted to permit designated cases to pass thereby without being moved thereby, detector means adjacent the path of the cases along the path of the ways positioned to pass into the hand-hole of each case, and when entering thereinto, to allow the moving means to remove the cases from the ways, means adaptable to be placed over the hand-holes of designated cases, said detector means then being unable to enter into said covered hand-holes, means actuated by the detector means to immobilize the removing means and thereby permit the designated cases to pass thereby without being removed thereby.

3. A case cleaning and separating mechanism comprising a way along which cases are adapted to be moved, means to designate certain cases from others, an inverting arm having case holding ways thereon over which the cases may slide, yielding means to swing said arm to invert cases thereon, means actuated by said designating means to prevent the swinging of said arm, and permit the designated cases to pass over the ways on the arm and be discharged therefrom.

4. A case cleaning and separating mechanism comprising a way, means to intermittently move cases over said way, means to designate certain cases from others, an inverting arm having case holding ways thereon over which cases may slide, means to swing said arm to invert cases thereon, said swinging means acting during dwells of said case moving means, means actuated by said case designating means to prevent the swinging of said arms and permit the designated cases to pass over the ways on the arm and be discharged therefrom.

5. A case conveying and transfer mechanism comprising a way along which uniform rectangular end hand-holed cases move, with the holes extending sidewise outwardly, removing means in the path of the cases to remove the uniform cases from the ways, means to retain said removing means from operation upon the passage of non-uniform cases thereby, detector means adjacent the path of the cases along the ways positioned to pass into the handhole of each uniform case, and when entering thereinto, releasing said retaining means to allow the removing means to remove the uniform cases from the ways.

6. A case cleaning and separating mechanism comprising a way along which cases classed as uniform and non-uniform are moved, means placed at the side of the non-uniform cases to designate them from the uniform cases, means to invert the uniform cases and empty the debris therefrom, means to prevent the operation of the inverting means, said case designating means actuating said preventing means, means to prevent the inverting means from inverting the designated cases, the inactive inverting means allowing the designated cases to pass thereby.

ALLAN C. DAVIS.

REFERENCES CITED

The following references are of record in the file of this patent:

UNITED STATES PATENTS

| Number | Name | Date |
|---|---|---|
| 1,412,631 | Righter | Apr. 11, 1922 |
| 1,693,014 | Anderson | Nov. 27, 1928 |
| 1,904,837 | Posey | Apr. 18, 1933 |
| 2,063,230 | Crady | Dec. 8, 1936 |